United States Patent [19]

Ushimaru

[11] 4,404,778
[45] Sep. 20, 1983

[54] METAL STRIP FOR PREVENTING INVASION
[75] Inventor: Chuji Ushimaru, Tokyo, Japan
[73] Assignee: Decol Co., Ltd., Tokyo, Japan
[21] Appl. No.: 254,130
[22] Filed: Apr. 14, 1981
[51] Int. Cl.³ .............................................. E04B 1/72
[52] U.S. Cl. ...................................... 52/101; 52/517; 52/309.4
[58] Field of Search ................... 52/101, 24, 517, 712, 52/309.4

[56] References Cited
U.S. PATENT DOCUMENTS

| 2,306,080 | 12/1942 | Peles | 52/101 |
| 3,282,000 | 11/1966 | Shaw et al. | 52/101 |
| 3,305,252 | 2/1967 | Jureit | 52/712 |
| 3,407,550 | 10/1968 | Shaw | 52/101 |
| 4,269,008 | 5/1981 | Assouline | 52/101 |

FOREIGN PATENT DOCUMENTS 13-11732  5/1938  Japan .
54-61080  4/1979  Japan .

Primary Examiner—J. Karl Bell
Attorney, Agent, or Firm—Fidelman, Wolffe & Waldron

[57] ABSTRACT

A barbed metal tape or strip for preventing invasion of any bird, animal or unauthorized person into a building, or the like comprises a multiplicity of V-shaped projections extending from its surface substantially perpendicularly thereto, and positioned close to one another so that a force acting on the strip may be uniformly distributed on the projections. It is extremely effective for crime prevention, maintenance of safety, protection of buildings, etc., and easy to install.

5 Claims, 5 Drawing Figures

METAL STRIP FOR PREVENTING INVASION

This invention relates to a metal strip for preventing invasion, and more particularly, to a metal strip for protecting a particular area against invasion by intruders such as birds, small animals, beasts and unauthorized persons.

Various measures have hitherto been taken for preventing the settlement or invasion of birds, such as doves, crows and sparrows, or small animals such as rats, wild cats, stray dogs and snakes, on or into building sites, houses, the eaves, window frames, verandas, or the like. Various means have also been developed for preventing intrusion of unauthorized persons such as thieves or burglars. Similar measures have been employed for preventing intrusion into houses, factories, warehouses, apartment houses, buildings for financial organizations, parking lots, facilities for protection of farm products, garden plants and fishes, areas in which dangerous facilities, such as towers for high voltage power transmission lines, and reservoirs for water storage are located, areas in which cultural properties are protected, or other special areas.

These areas and buildings are protected against intrusion of unauthorized persons or burglars, birds or small animals by, for example, barbed wires, glass fractions or nails laid or embedded on or in the upper edges of walls, roofs, eaves, beams, window frames, doors, fences or the like. They are all relatively easy to install or provide.

Barbed wires are most commonly used. They are, however, not satisfactory since they are difficult to install in a narrow place, and their barbs are so widely spaced apart from one another that they cannot prevent invasion of small birds or animals. They are likely to be employed in limited kinds of places, since it is a cumbersome job to install them, and they never provide any fine external appearance. For these reasons, barbed wires are now not used for houses or buildings.

There is also known a strip provided with V-shaped projections. These projections lie in one and the same direction on the strip, and fail to withstand a heavy load. Therefore, it has been necessary to use a thick strip. They can withstand a force applied thereto along their bottoms, but are easy to bend if a force is applied to their free ends prependicularly thereto. The bent projections make the strip entirely useless.

A metal strip for preventing invasion according to this invention has been developed for eliminating the aforesaid drawbacks of the prior art.

It is an object of this invention to provide a metal strip for protecting a particular area against invasion or settlement.

It is another object of this invention to provide a barbed steel tape which is easy to install, does not impair the external appearance of a building or the like, and is inexpensive.

These and other objects and advantages of this invention will become apparent from the following detailed description, and the accompanying drawings.

Figure 1:
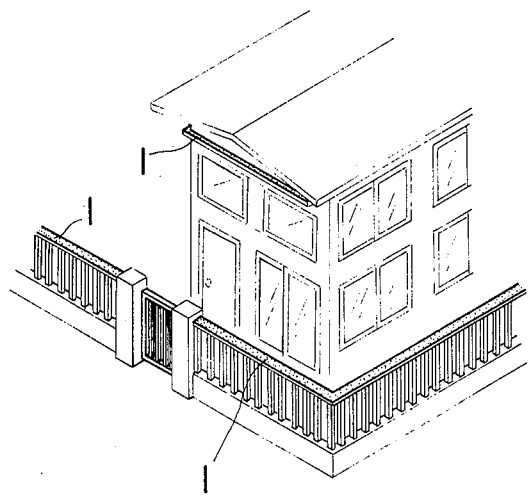
FIG. 1 shows by way of example a building for which a metal strip tape embodying this invention is installed.

Referring first to FIG. 1 of the drawings, there is shown a metal strip of this invention generally designated by reference numeral 1, and employed for protecting a house against invasion and burglars.

FIGS. 2 to 5 show the metal strip 1 in further detail. The metal strip 1 has a relatively small thickness, and is highly flexible, and preferably has a surface polished to reflect light. It preferably comprises a stainless steel strip having a small thickness of, say, 0.1 mm so that it may be easy to cut, transport or form into a roll.

The strip 1 is provided with a multiplicity of inverted V-shaped projections 2 formed by cutting out the strip material and extending upwardly from its surface substantially perpendicularly thereto, and a corresponding number of openings 3 formed beside the projections 2.

Each of the projections 2 has a sharp-pointed end, and they comprise four differently directed groups of projections 2a to 2d in the embodiment of the invention. All the projections of each group are formed identically in a line, and located close to one another, so that a force acting downwardly against the strip 1 may be equally distributed on the projections.

Figure 2:
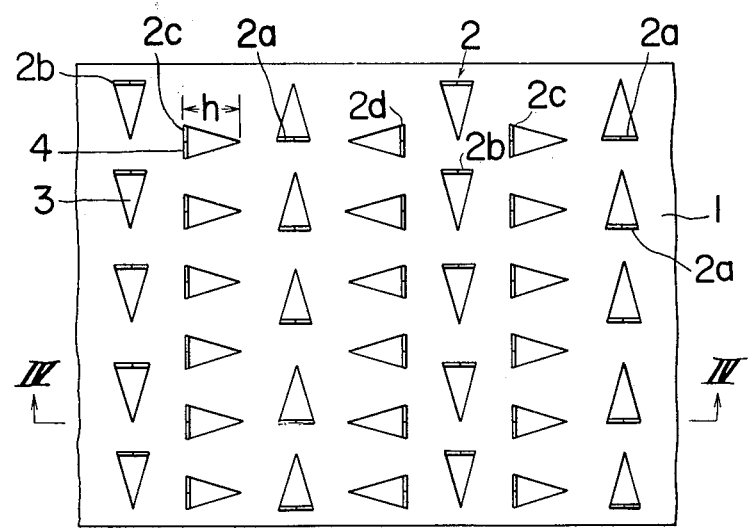
FIG. 2 is a top plan view showing fragmentarily a metal strip embodying this invention, and the projections formed thereon.
Figure 3:
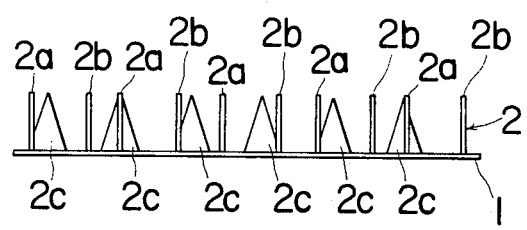
FIG. 3 is a right side elevational view of FIG. 2.
Figure 4:
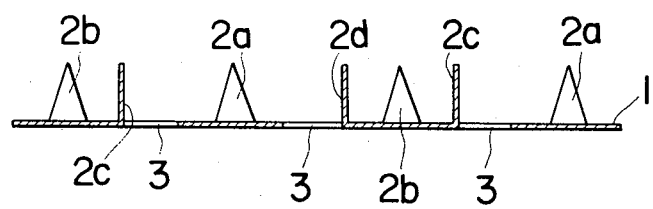
FIG. 4 is a sectional view taken along the line IV—IV of FIG. 2.

Referring to FIG. 2 in further details, the projections 2a and 2b have their bases extending in parallel to the longitudinal edges of the strip, while the projections 2c and 2d each have their bases located in a line which is perpendicular to the longitudinal edges of the strip. The projections 2a and 2b are formed alternately with the projections 2c and 2d when viewed ongitudinally of the strip. The base of each projection 2a lies in a line which extends longitudinally of the strip, and in which the pointed ends of the projections 2c and 2d are substantially situated. The projections 2a to 2d are substantially equally spaced apart from one another, and the projections in each row 2a, 2b, 2c or 2d are substantially equally spaced apart from one another across the width of the strip. The projections 2a and 2b are formed by the cutting of holes 3 in oppositely directed patterns, and positioned in a zigzag fashion across the width of the strip. Likewise, the openings or holes 3 left by the formation of the projections 2c and 2d are directed in opposite directions. Each projection 2 is preferably shaped in the form of an equilateral triangle, i.e., has a height h which is greater than the length of its base 4.

Figure 5:
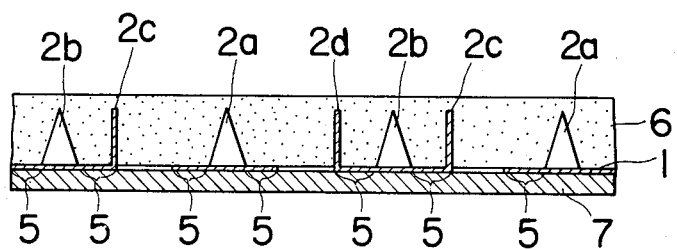
FIG. 5 is a cross sectional view of the metal strip of this invention having an upper surface on which a cushiony material is provided, and a lower surface to which an adhesive tape is applied.

If the strip 1 is large in width, it is difficult to straighten it from a roll. Therefore, the flat portions between the rows of the projections 2 are punched in a planar form to define webs 5 with predetermined spacing as shown in FIG. 5. The strip 1 may be secured to the object to be projected against intrusion by an adhesive applied to the rear or lower surface of the strip 1 or the object to be protected. Alternatively, a double-coated adhesive tape 7 may be applied to the lower surface of the strip 1, as shown in FIG. 5, to secure the strip to the object to be protected, i.e., the upper edge of a fence, a roof, the eaves, a ventilation port, a window frame, or any other place through which an unauthorized person, harmful birds or animals, or the like are expected to intrude.

A cushiony material 6, such as a foamed synthetic resin, may be applied to the front or upper surface of the strip 1 as shown in FIG. 5 for protecting the projections 2 against deformation when the strip 1 is formed into a roll, or facilitating application of a force to the strip 1 when it is secured to the object to be protected. The cushiony material 6 preferably has a width which is equal to, or slightly smaller than that of the strip 1, and a thickness which is at least equal to the height of the projections 2.

According to this invention, the light reflected by the strip, or the thorny projections formed thereon prevent settlement or invasion of birds, small animals, beasts or unauthorized persons.

The strip 1 of this invention can be kept in the form of a roll during storage when it is not used, or while it is on the market. Therefore, it is light in weight, easy to transport, and safe to handle. When the strip is formed into a roll, a foamed synthetic resin may advantageously be disposed between the rear surface of the strip and the barbed surface thereof in order to protect the projections against deformation or breakage.

The strip 1 according to this invention may be cut to an appropriate length as required, and secured easily to any place where protection against intrusion is sought, for example, a window or ventilation port in a building, a roof, the upper edge of a fence, or a ventilation port in a fence, as shown in FIG. 1. It does not adversely affect the external appearance of a building, fence or the like.

Droppings of birds are often found under the eaves of, or on the window frames of a building which may be designated as important cultural property, and give rise to environmental pollution. The droppings of doves cause a particularly serious problem of pollution in shrines, temples, stations, apartment complexes, multi-storied buildings, or the like. The problem is so serious that efforts are being made in some places to catch doves with a lime. Under these circumstances, the barbed metal strip of this invention is highly effective for protection of those buildings from any such pollution, while maintaining their beautiful external appearance, since it disables any bird to settle on the buildings.

Although the strip of this invention comprises a thin stainless steel strip, the projections are provided so close to one another as to permit uniform distribution of any external force acting on the strip. The projections retain a high degree of strength against an external force, in whichever direction the force may be applied to the projections. Even if an intruder may, for example, tread on the strip, the projections are hardly bent, but on the contrary, the intruder will definitely have a seriously injured sole or soles. The strip of this invention can withstand a considerably large weight for a long period of time, and is inexpensive to manufacture. All of these features testify a high level of utility of this invention.

What is claimed is:

1. A metal strip for preventing invasion comprising a metal strip having a surface formed with a multiplicity of V-shaped projections extending from said surface substantially perpendicular thereto and positioned close to one another, whereby a force acting on said projections is distributed uniformly thereon, said projections 2 comprise four kinds of projections each lying in a row transversely of said strip 1, and provided alternately to one another longitudinally of said strip 1, said rows being equally spaced apart from one another, said projections being substantially equally spaced apart from one another in each row, two of said four kinds of projections, 2a and 2b, being separated from each other by another kind of projections, and having each a base extending in parallel to the longitudinal edges of said strip 1, the other two kinds of projections 2c and 2d each having a base which is perpendicular to said longitudinal edges of said strip, each of said projection 2a having its base located substantially in a line in which the bases of said projections 2c and 2d lie, said projections 2a and 2b being formed by two kinds of oppositely directed cuts in said strip 1, while the other projections 2c and 2d are likewise formed by two kinds of oppositely directed cuts in said strip.

2. An animal repellant structure adaptable for quick attachment to window ledges and the like and comprising:
a sheet metal strip having first and second surfaces and plural elements, said plural elements having pointed ends projecting outwardly from said first surface in a generally perpendicular direction to provide a tactile repellent; and
removable protection means for disabling said tactile repellent such that a person may apply pressure, in a direction opposite of that in which the pointed ends project, during application of said strip to said support and may subsequently remove said protection means to enable said tactile repellant.

3. An animal repellent as in claim 2, including attachment means, said means comprising:
a tape coated on both sides with an adhesive, one adhesive side of which is adhered to said second surface, the other adhesive side of which is covered by a removable protective liner, such that said liner may be removed and said other adhesive side may be adhered to a support for attachment of said strip thereto.

4. A structure as in claim 2, wherein at least said elements of said structure are polished to provide a visual repellent when light is reflected therefrom.

5. A structure as in claim 2, wherein said elements comprise a strip-to-pointed end height and said protection means comprises:
a foamed synthetic resin-like material substantially covering said first surface and having a thickness at least as great as said height.